Oct. 29, 1968  R. B. WILLI  3,408,049

EMERGENCY WICKET GATE STOP

Filed June 21, 1967

INVENTOR
RICHARD B. WILLI

BY Seidel & Gonda

ATTORNEYS.

United States Patent Office 3,408,049
Patented Oct. 29, 1968

3,408,049
EMERGENCY WICKET GATE STOP
Richard B. Willi, Norristown, Pa., assignor to Balwin-Lima-Hamilton Corporation, Philadelphia, Pa., a corporation of Delaware
Filed June 21, 1967, Ser. No. 647,821
3 Claims. (Cl. 253—122)

ABSTRACT OF THE DISCLOSURE

An emergency wicket gate stop to prevent a wicket gate from entering the runner of a hydraulic machine and striking the runner blades should such wicket gate become loose from its operating mechanism. The hydraulic machine is constructed so that the wicket gate which becomes loose from its operating mechanism will contact the outer circumferential edge of the runner shroud interconnecting the bottom edges of the runner blades and the outer circumferential edge of the disc interconnecting the top edges of the runner blades rather than the runner blades.

---

Figure 1:
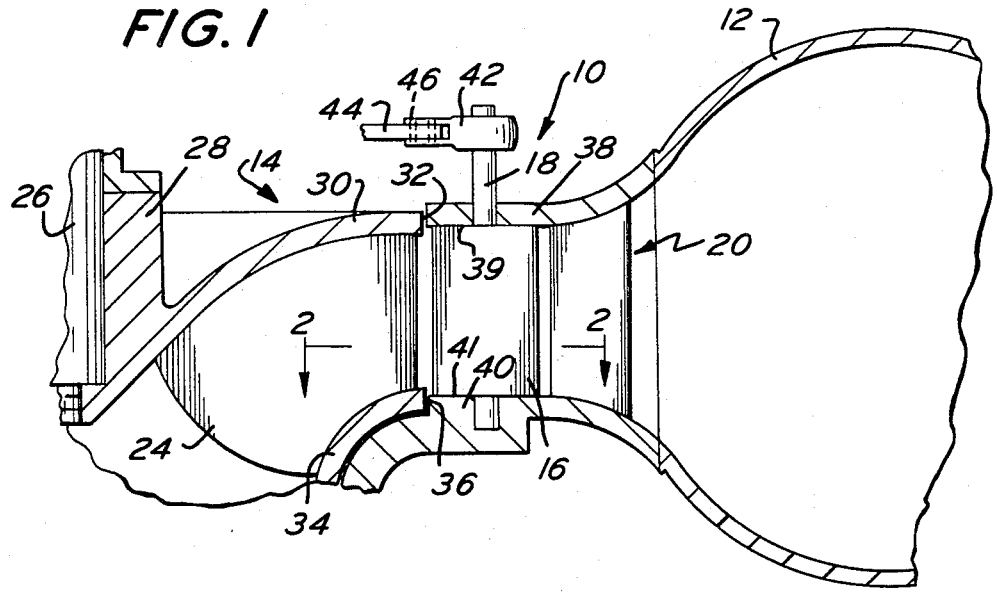

The prevent invention is directed to an emergency wicket gate stop for preventing damage to the runner blades of a hydraulic machine should a wicket gate or gates become loose from their operating mechanism.

It is conventional in the design of a hydraulic machine to provide a shear pin or shear link in the connecting linkage between the arms operatively associated with the shifting ring and the link connected to the wicket gate stems. Should normal closure of one or more of the wicket gates be prevented due to a blockage or the like, the shear pin or shear link will break before damage is done to the wicket gate. Upon shearing of this sacrificial member, the wicket gate or gates affected are free to rotate. It has been found that the gates may rotate with tremendous force. It has been proposed heretofore to provide stops at each end of the wicket gate linkage to prevent the wicket gate or gates involved from swinging into the runner blades. It has been found, however, that when a shear pin or shear link breaks, the gates swing with such force that either the stops or the wicket gate linkage may be broken. When this occurs, the wicket gate or gates involved are free to swing into the runner blades thereby causing serious damage.

It is an object of the present invention to provide an emergency wicket gate stop for a hydraulic machine.

It is another object of the present invention to provide an emergency wicket gate stop for a hydraulic machine wherein damage to the runner blades of the hydraulic machine is prevented should a wicket gate be free to rotate.

It is a further object of the present invention to provide an emergency wicket gate stop which may be used as a back-up safety feature should the normally provided stops or linkages be broken due to the force with which the wicket gate or gates rotate.

It is still a further object of the present invention to provide an emergency wicket gate stop which is inexpensive to manufacture and yet highly effective in use.

Other objects will appear hereinafter.

The above and other objects are accomplished by means of the present invention. The wicket gates are mounted between stationary components of hydraulic machines. The wicket gates are mounted adjacent the runner. The runner shroud which connects the lower edges of the runner blades is not aligned with the stationary components of the hydraulic machines as is conventional, but rather extends above the bottom stationary component of the machine. Also, the outer circumferential edge of the disc to which the top edges of each of the runner blades are connected, which is normally aligned with the stationary components of the hydraulic machine, is positioned below and out of alignment with the top stationary component. A portion of the outer circumferential edge of the disc and the shroud provide an emergency wicket stop which will prevent a wicket gate from contacting the runner blades should a shear pin in the wicket gate mechanism shear thus permitting free rotation of the wicket gate.

For the purposes of illustrating the invention there is shown in the drawings a form which is presently preferred; it being understood, however, that this invention is not limited to the precise arrangements and instrumentalities shown.

Figure 2:
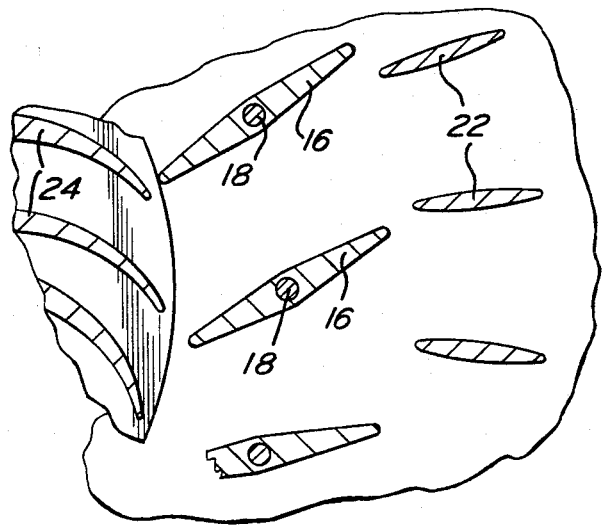

FIGURE 1 is a partial section view of a hydraulic machine embodying the principles of the present invention; and FIGURE 2 is a section view taken along line 2—2 in FIGURE 1.

Referring now to the drawings in detail, wherein like numerals indicate like elements throughout the several views, there is shown in FIGURE 1 a portion of a hydraulic machine generally indicated by the reference numeral 10.

The hydraulic machine 10 may be a turbine or a pump-turbine of conventional construction except as hereinafter set forth. The machine 10 includes a spiral casing 12 and a runner 14. A plurality of wicket gates 16 are secured to stems 18 for rotation therewith. A stay ring 20 is provided adjacent the wicket gates 16. The stay ring 20 has vanes 22 therein.

The runner 14 includes a plurality of runner blades 24. The runner 14 is secured to the main shaft 26 of the hydraulic machine 10 for rotation therewith. The runner 14 further includes a hub 28 secured to the lowermost end of the shaft 26 and a disc 30 integral with the hub 28. The disc 30 has an outer circumferential edge 32.

The runner blades 24 are connected at their lowermost ends by a discharge shroud 34. The discharge shroud 34 has an outer circumferential edge 36 which is in substantially the same vertical plane as the outer circumferential edge 32 of the disc 30.

The hydraulic machine 10 includes an upper stationary housing component 38 and a lower stationary housing component 40, respectively. The wicket gates 16 extend between the inner surfaces 39 and 41, respectively, of the stationary housing members 38 and 40.

The outer circumferential edge 32 of the disc 30 extends below the inner surface of the upper stationary housing component 38 and the outer circumferential edge 36 of the discharge shroud 34 extends above the inner surface 41 of the lower stationary housing component 40 for a purpose which will be made clear hereinafter.

The stems 18 of the wicket gates 16 are provided with links 42 at the uppermost ends thereof. The links 42 are connected to arms 44 with which arms are in turn connected to a shifting ring (not shown). The shifting ring causes rotation of the stems 18 and the wicket gates 16 attached thereto in a conventional manner. Shear pins 46 are provided in the connection of the links 42 to the arms 44. It is conventional in the design of a hydraulic machine to provide a shear pin or shear link in the connecting linkage between the link 42 and the shifting ring (not shown). The shear pin, such as shear pin 46, is provided so that should movement of a wicket gate or several wicket gates 16 be prevented due to a blockage or the like, the shear pin 46 will shear or break before damage is done to the wicket gates 16 or the wicket gate stems 18.

After the shear pin 46 shears, the wicket gate or gates 16 are free to rotate, oftentimes with tremendous force. It has been proposed to provide stops to prevent the link 42 from rotating to a disposition wherein the wicket gate 16 swings into the runner causing general damage. However, it has been found that the wicket gate 16 will rotate with such tremendous force that either the links 42 will be broken or the stops provided for the links 42 will be broken. If a wicket gate is permitted to rotate into a position wherein it contacts the runner blades 24 it can cause very serious damage to the runner blades which is to be avoided if at all possible.

By misaligning the outer circumferential edges 32 and 36 with the stationary housing components 38 and 40, respectively, a highly effective emergency wicket gate stop is provided. The lower portion of the outer circumferential edge 32 and the upper portion of the outer circumferential edge 36 will contact a freely rotating wicket gate 16 and prevent the same from contacting the runner blades 24. Thus, by misalignment of the outer circumferential edges 32 and 34 with the stationary housing components 38 and 40 damage to the runner blades 24 by a freely rotating wicket gate 16 is prevented.

The outer circumferential edges 32 and 36 may hereinafter be referred to as peripheral lips or edges. The stationary housing components may hereinafter be referred to as stationary housing structures or stationary housing members. The discharge shroud may hereinafter be referred to as a bottom shroud member or bottom member.

The present invention may be embodied in other specific forms without departing from the spirit or essential attributes thereof and, accordingly, reference should be made to the appended claims, rather than to the foregoing specification as indicating the scope of the invention.

I claim:

1. A hydraulic machine comprising a runner including a plurality of runner blades thereon, said runner having a top member connected to the tops of said runner blades, said runner having a bottom shroud member connected to the bottoms of said runner blades, said top member and said bottom member having inner surfaces facing each other, a plurality of wicket gates each supported for rotational movement on a wicket gate stem, said wicket gates extending between a top stationary housing structure and a bottom stationary housing structure, the height of said wicket gates being greater than the distance between the inner surfaces at the peripheries thereof on said top and bottom members so that a wicket gate will contact at least one of said top and bottom members and not a runner blade thus preventing damage to the runner blades by a wicket gate which is free to rotate toward and away from said runner blades.

2. A wicket gate stop means for a hydraulic machine including a runner having a plurality of runner blades connected thereto, said runner being supported in a fixed operating position, at least one wicket gate being supported for rotation on a stem, said wicket gate extending between the inside surfaces of a top stationary housing member and a bottom stationary housing member, an operating mechanism for moving said wicket gate, said operating mechanism including a shear element therein wherein said shear element will break upon malfunction of said wicket gate thereby permitting said wicket gate to rotate freely, said wicket gate stop means including a discharge shroud having an outer circumferential lip thereon, said lip being between said wicket gate and said runner blades when said runner is in said fixed operating position, a portion of said lip extending above said bottom stationary housing member and into the path of rotation of said wicket gate whereby said portion of said lip will contact a freely rotating wicket gate to prevent contact of said wicket gate with said runner blades.

3. A wicket gate stop means as set forth in claim 2 including a disc interconnecting the tops of said runner blades, said disc having an outer peripheral edge thereon, said edge being between said wicket gate and said runner blades, a portion of said outer peripheral edge extending below the plane defined by the inside surface of said top stationary housing member, wherein said portion of said edge and said portion of said lip prevent a freely swinging wicket gate from contacting the runner blades.

References Cited
UNITED STATES PATENTS

| 1,823,702 | 9/1931 | Ring | 253—117 |
| 3,237,565 | 3/1966 | Hartland | 103—97 |

FOREIGN PATENTS

| 454,314 | 4/1928 | Germany. |
| 92,232 | 12/1921 | Switzerland. |

EVERETTE A. POWELL, Jr, *Primary Examiner.*